United States Patent [19]
Carter

[11] Patent Number: 5,580,152
[45] Date of Patent: Dec. 3, 1996

[54] BICYCLE HANDLEBAR LIGHT

[76] Inventor: Russell E. Carter, 29001 Jasmine Creek La., Highland, Calif. 92346

[21] Appl. No.: 514,600

[22] Filed: Aug. 14, 1995

[51] Int. Cl.[6] ........................................ B62J 6/18
[52] U.S. Cl. .................. 362/72; 362/187; 280/288.4; 74/551.8
[58] Field of Search ................ 362/72, 187; 280/288.4; 74/551.8

[56] References Cited

U.S. PATENT DOCUMENTS

| | | | |
|---|---|---|---|
| 4,623,954 | 11/1986 | Schott et al. | 362/72 |
| 4,656,564 | 4/1987 | Felder | 362/72 |
| 4,716,502 | 12/1987 | Schott et al. | 362/72 |
| 4,875,142 | 10/1989 | Spector | 362/72 |
| 4,980,805 | 12/1990 | Maglica et al. | 362/72 |
| 5,008,782 | 4/1991 | Murray | 362/72 |
| 5,213,408 | 5/1993 | Shiau | 362/187 |
| 5,247,431 | 9/1993 | Liu | 362/72 |
| 5,297,445 | 3/1994 | Chen | 74/551.3 |
| 5,319,995 | 6/1994 | Huang | 74/551.8 |
| 5,355,746 | 10/1994 | Lin | 362/72 |

FOREIGN PATENT DOCUMENTS

| 45521 | 4/1932 | Denmark | 74/551.8 |
|---|---|---|---|

*Primary Examiner*—James C. Yeung
*Assistant Examiner*—Alfred Basichas
*Attorney, Agent, or Firm*—Knobbe, Martens, Olson & Bear

[57] ABSTRACT

A light assembly for a bicycle that comprises a power source, configured to be positioned within either the handlebars of the bicycle or bar end members attached to the handlebars of the bicycle, and a light source that is adjustable by the user. In one embodiment, the light assembly is positioned at either end of the handlebars and are independently adjustable about two orthogonal axes to allow the bicyclist to illuminate two different regions in the path of travel of the bicycle. In a second embodiment, the light assembly is positioned at the outer end of either of the bar end members attached to the handlebars and are independently adjustable about two orthogonal axes to allow the bicyclist to illuminate two different regions in the path of travel of the bicycle.

24 Claims, 4 Drawing Sheets

10

BICYCLE HANDLEBAR LIGHT

BACKGROUND OF THE INVENTION

1. Field of the Invention

The present invention generally relates to bicycles and, in particular, concerns one or more headlights to be mounted on the handlebars of a bicycle.

2. Description of the Related Art

Headlights have been used on bicycles for a considerable length of time. Generally, headlights are used to illuminate the intended path of the bicycle in low light conditions. The typical headlight used on a bicycle is comprised of a lamp which mounts on the cross-piece of the handlebars and faces forward. This lamp can either be battery operated or it can be powered by a generator that is attached to one of the wheels. While this type of headlight is commonly used, it suffers from several disadvantages.

In particular, this type of headlight is often very heavy and it also presents a rather bulky appearance positioned on top of the handlebar. Currently, the trend in bicycles is for the accessory equipment to be as light and as streamlined as possible. Hence, the typical prior art headlight is often not aesthetically pleasing due to its rather bulky appearance. While efforts have been made in the prior art to streamline the appearance of bicycle headlights, the fact that these headlights typically include a battery pack necessitates that they be comparatively large in size and project upward from the handlebars.

One possible solution to the problem of unaesthetic bicycle headlights is to mount the headlight in the frame of the bicycle. In the prior art, there is some teaching of mounting the bicycle lights within the handlebars so that the lights produce a beam which projects out of the ends of the handlebars (See, e.g., U.S. Pat. No. 4,623,954 to Schott et al., U.S. Pat. No. 5,247,431 to Liu et al., and U.S. Pat. No. 4,875,142 to Spector). However, the prior art discloses positioning lighting apparatuses within the handlebars of bicycles primarily for the purpose of providing a rearward facing safety light. It can be appreciated that a rearward facing safety light does not provide the same benefit to the bicyclist as a forward facing headlight. Further, it is generally desirable to be able to adjust the headlight so that the headlight is illuminating the ground a desired distance in front of the bicyclist. The prior art references that disclose positioning lights within handlebars and other structures of the bicycle are all fixed and are not adjustable.

Hence, there is a need in the prior art for an aesthetically pleasing bicycle headlight assembly that is adjustable so that the bicyclist can adjust the headlight assembly to illuminate the ground a desired distance in front of the bicyclist. To this end, there is a need for a headlight assembly that is capable of providing enough light energy to adequately illuminate the path of the bicycle, and yet is small enough so as to be aesthetically pleasing. Further, this light should be adjustable both up and down and from side to side to allow the bicyclist a tremendous amount of flexibility in adjusting the assembly to produce a light pattern which illuminates the desired region along the path of the bicycle.

SUMMARY OF THE INVENTION

The aforementioned needs are satisfied by the bicycle light assembly of the present invention which is comprised of a power pack that is positioned within a portion of a handlebar of a bicycle and a light source that is attached to the handlebar in such a way as to be adjustable. Preferably, the light source is adjustable both up and down and from side to side so that the bicyclist can point the light source in a desired direction to illuminate a region generally in front of the bicycle.

In one embodiment of the invention, the power pack is positioned within a generally horizontally extending handlebar and the bicycle light assembly includes a bracket assembly that is attached to the end of the handlebar. The bracket assembly is preferably attached to the end of the handlebar so as to be rotatable about an axis that is defined by the handlebar. Further, the bracket assembly is also preferably configured to receive a light source and to allow the light source to rotate about a second axis, which is substantially orthogonal to the axis defined by the handlebar. Hence, the light source can be adjusted about two axes which allows the bicyclist great flexibility in orienting the light source to illuminate a desired region. It will be appreciated that the bicyclist may wish to illuminate an area farther ahead of the bicycle when travelling faster.

Further, the bicycle lighting assembly of the preferred embodiment can be positioned at both ends of the handlebars so that the bicyclist can independently position the bicycle light assemblies to illuminate two separate regions generally in front of the bicycle. Certainly, with the bicycle headlights of the prior art, it is only possible to illuminate a single region.

In another embodiment of the invention, the bicycle light assemblies are adapted to be mounted to bar end members which are attached to the handlebars of the bicycle. Bar end members are structures which are mounted on the handlebars of bicycles, typically mountain bikes, that extend generally upward from the handlebars. The bar end members enable the bicyclist to more readily lift up the front end of the bicycle while climbing hills. In this embodiment of the bicycle light assembly, the power pack, consisting of a battery in the preferred embodiment, is positioned within the bar end members and a bracket assembly is mounted at the end of the bar end members opposite the handlebars. The light source is attached to the bracket assembly so as to be adjustable about an axis that is defined by the bar end member and also so as to be adjustable about an axis substantially orthogonal to the bar end thereby providing two degrees of adjustability of the light sources.

In either of the embodiments, the light source is preferably comprised of a light bulb and a reflector plate positioned within a housing that has an opening at a first end which is covered by a lens. The reflector plate is configured to reflect light produced from the light bulb through the lens in a first direction. The light assembly is adjustable so that the beam emanating from the lens of the light source is directed in a desired direction as described above. Further, in the preferred embodiment the light source is focusable so that the bicyclist can easily change the configuration of the beam. In this manner, the bicyclist can selectively illuminate a wide area or can illuminate a smaller area more intensely.

Hence, the light assemblies of the preferred embodiments have small profiles due to the power pack being positioned within the handlebars or the bar ends. Further, the light assembly of the preferred embodiment is adjustable so that the bicyclist can position the assembly to shine in a desired direction and illuminate an area a desired distance from the bicycle. It will also be appreciated that two separate light assemblies can be installed at the ends of either the handlebars or at the ends of two bar end members positioned on the handlebars of the bicycle so that a variable lighting pattern can be established by the bicyclist using the light assemblies.

These and other advantages and features of the present invention will become more fully apparent from the following description and appended claims taken in conjunction with the accompanying drawings.

DETAILED DESCRIPTION OF THE PREFERRED EMBODIMENTS

Figure 1:
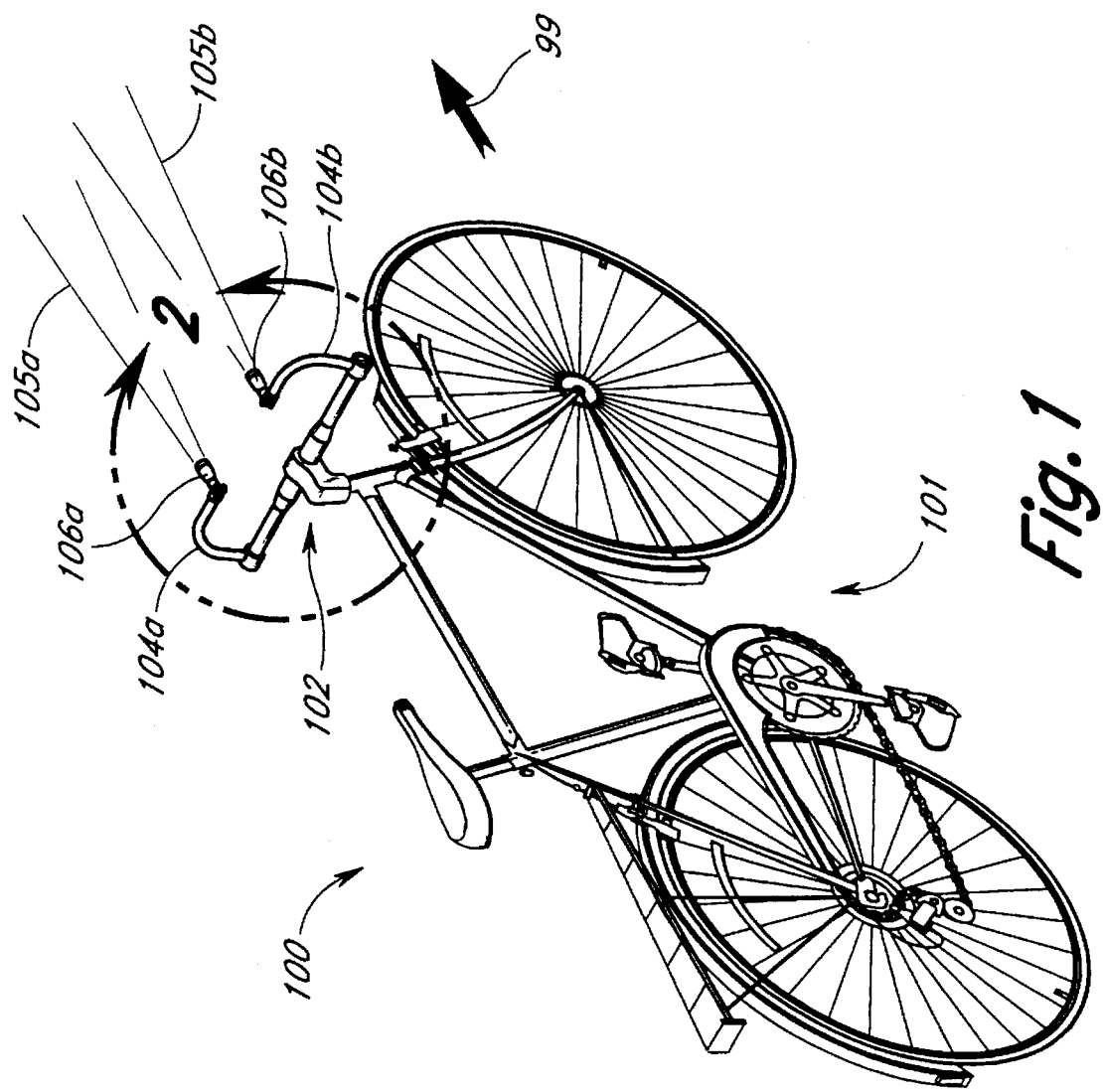
FIG. 1 is a bicycle with a preferred embodiment of the light assembly mounted thereon.

Reference will now be made to the drawings wherein like numerals refer to like parts throughout. FIG. 1 illustrates a bicycle 100 travelling along a path in a first direction as indicated by arrow 99. The bicycle 100 has a frame 101 and a set of handlebars 102 wherein two bar end members 104a, 104b are mounted at the extreme ends of the handlebars 102. Two light assemblies 106a, 106b are respectively mounted at the ends of the bar end members 104a, 104b opposite the handlebars 102.

The bicycle 100 can consist of any configuration of bicycle known in the prior art including mountain bikes which typically have straight handlebars such as the handlebars 102 shown in FIG. 1. The bar end members 104a, 104b can be any of a number of bar end members available in the prior art such as the bar end members shown in FIG. 1 of U.S. Pat. No. 4,656,564. The light assemblies 106a 106b each produce a light beam 105 which, as will be described in greater detail hereinbelow, is adjustable by the bicyclist (not shown) to illuminate different regions, at different focuses, in the direction of travel of the bicycle, i.e., in the direction of arrow 99.

Figure 2:
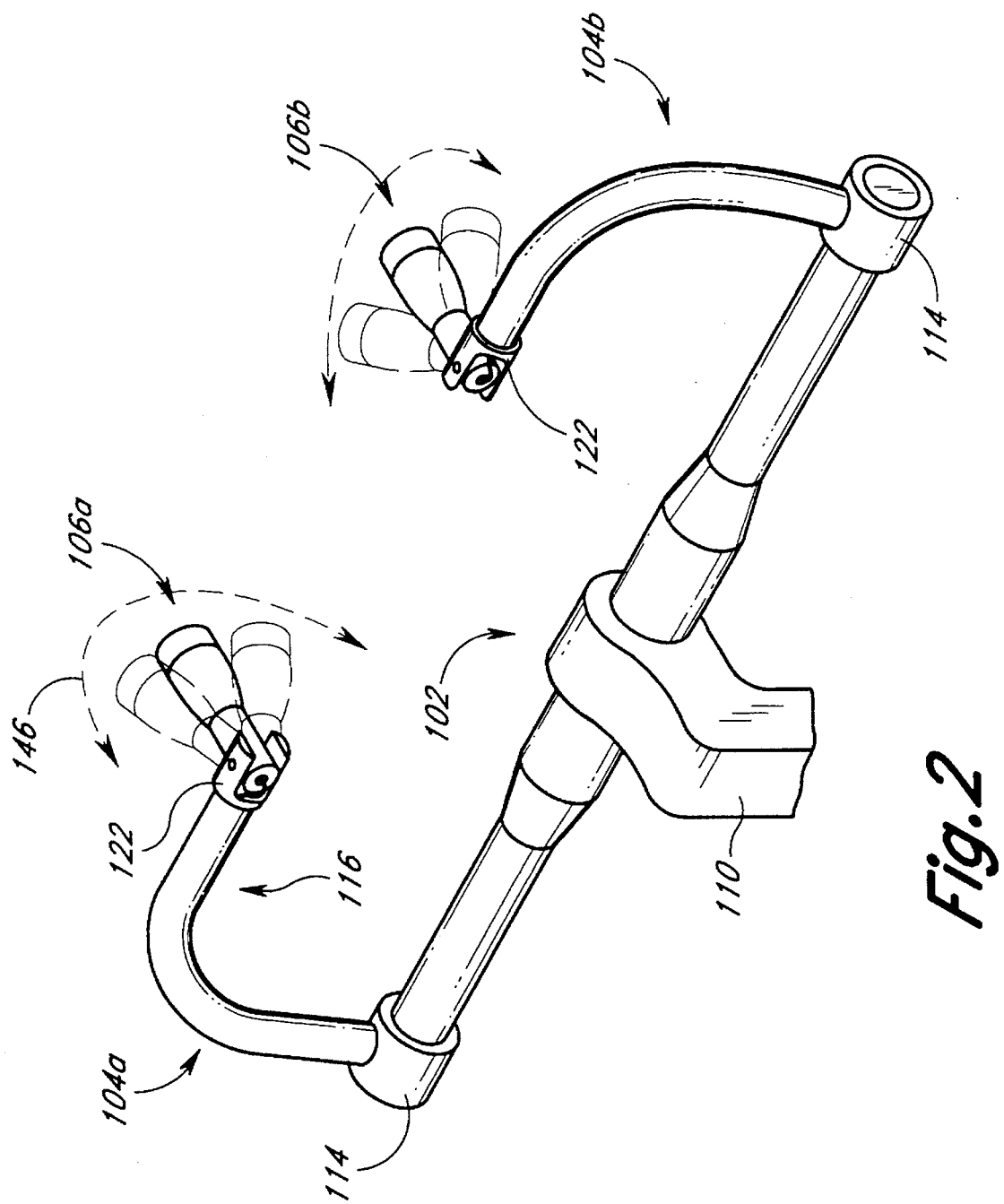
FIG. 2 is a perspective view of one embodiment of a light and handlebar assembly wherein the light assembly is mounted on bar end members that are, in turn, mounted to the handlebars of a bicycle.

Referring now to FIG. 2, the handlebars 102 and the bar end members 104a, 104b are shown in greater detail. In particular, the handlebars 102 in this embodiment are mounted to a central column 110 of the bicycle that is attached to the front forks and front wheel of the bicycle so as to allow the bicyclist to steer the bicycle by pivoting the handlebars 102. The handlebars 102 extend laterally outward from the frame 101 of the bicycle 100 so as to be generally perpendicular to the frame 101 (FIG. 1) of the bicycle when the bicycle is travelling in a straight line. The bar end members 104a, 104b each include mounting rings 114 that are sized to slip over the ends of the handlebars 102. Preferably, the mounting rings 114 include a securing device (not shown), such as a set screw, that will secure the bar end members in a desired orientation to the handlebars 102. Specifically, the bar end members 104a, 104b are generally mounted so as to extend upward from the handlebars 102 and also slightly forward of the handlebars 102 in the manner shown in FIG. 2. Further, the bar end members 104a, 104b are also bent so as to extend inward from the outer edge of the handlebar toward the center column 110 of the bicycle 100. The light assemblies 106a, 106b in this embodiment are positioned at an end 116 of the bar ends 104a, 104b opposite the mounting ring 114.

Figure 3:
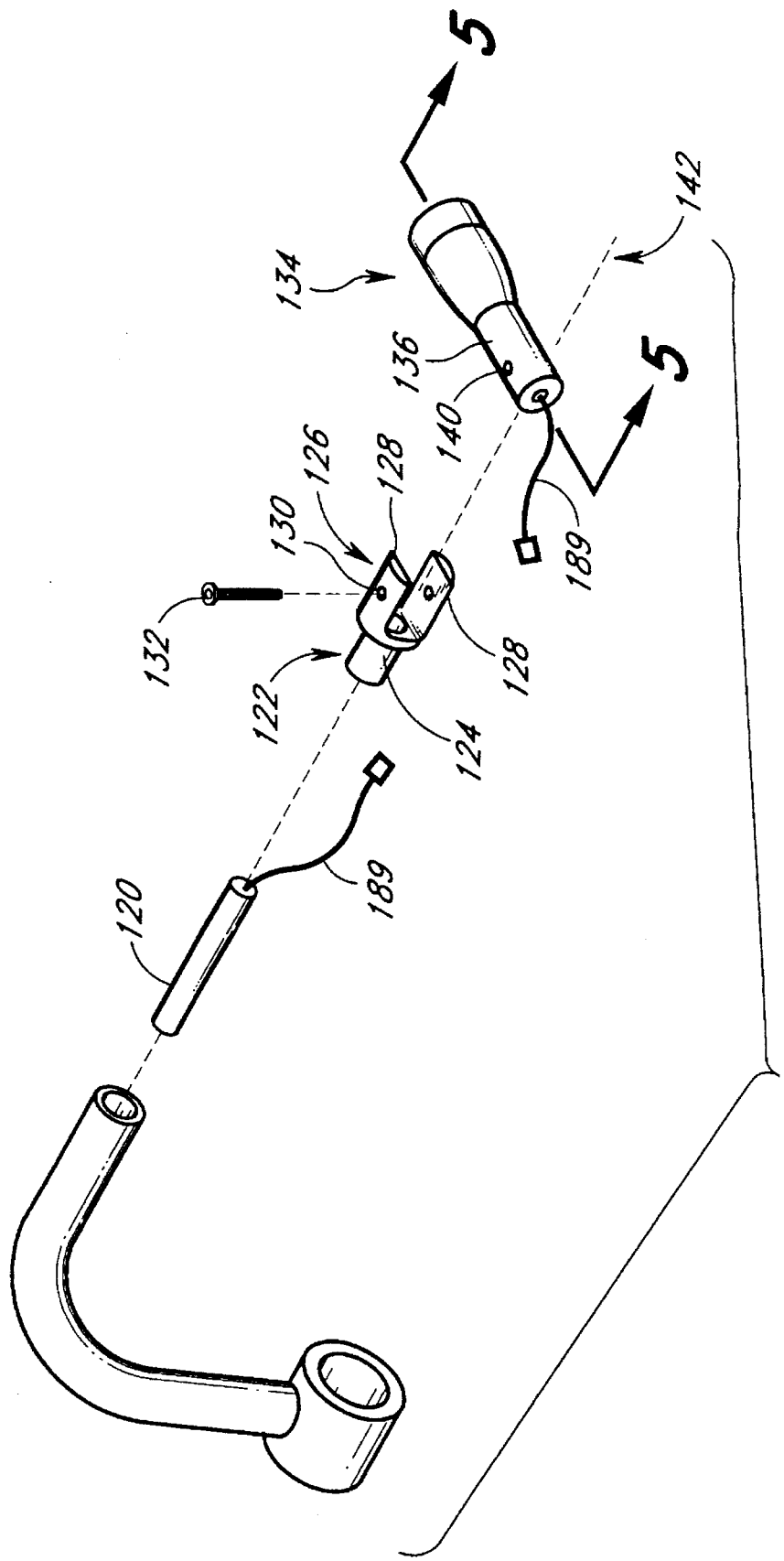
FIG. 3 is an exploded perspective view illustrating the components of the light assembly that is mounted on the bar end member of FIG. 2.

Referring now to FIG. 3, the light assemblies 106a, 106b are illustrated. Specifically, both of the light assemblies 106a and 106b respectively include a power source 120 that, in the preferred embodiment, is comprised of at least one "AA" or "AAA" battery. The power source 120 is preferably positioned inside of the bar end member 104 and is securely retained therein. The light assemblies 106a, 106b also include a bracket plug 122 that has a circular plug portion 124 and a yoke portion 126. The circular plug portion 124 of the light assembly 106 is preferably sized so as to flushly fit inside of a circular opening 118 in the end of the bar end member 104 and is securely retained therein. The yoke portion 126 has two arms 128 that are spaced apart to define the yoke 126 portion of the bracket plug 122. Two holes 130, that are configured to receive a retaining screw 132, are formed in both the arms 128 of the yoke portion 126 of the bracket plug 122.

The light assemblies 106a, 106b also each include a light source 134 which has a mounting housing 136 which, in the preferred embodiments, is generally cylindrical in shape and has a diameter that is configured to flushly fit within the yoke portion 126 between the arms 128. The mounting housing 136 also includes an opening 140 extending therethrough that is configured to receive the retaining screw 132. Hence, the light source 134 is positioned within the yoke portion 126 of the bracket plug 122 so that the opening 140 in the mounting housing 136 is aligned with the holes 130 in the arms 128 of the yoke portion 126. The retaining screw 132 is then positioned through the two holes 130 in the arms 128 of the yoke portion 126 and through the opening 140 in the mounting housing 136 of the light source 134.

The retaining screw 132 secures the light source 134 in the yoke portion 126 in a manner where it can be rotated about an axis that is defined by the retaining screw 132 extending between the arms 128 of the yoke portion 126 of the bracket plug 122. Further, the circular plug portion 124 of the bracket plug 122 is preferably sized so as to be flush fit within the circular opening 118 in the bar end member 104. Preferably, the bracket plug 122 can be rotated about an axis 142 that extends perpendicularly outward from the center of the opening 118 in the bar end member 104.

Referring back to FIG. 2, the construction of the light assembly 106 wherein the light source 134 is movable within the yoke portion 126 of the bracket plug 122 and the bracket plug 122 is, in turn, movable within the opening 118 of the bar end member 104, allows the light source 134 to be oriented over a range of rotational positions about the retaining screw 132 and also to be oriented over a range of rotational positions about the axis 142 defined by the opening 118 in the bar end member 104. In the embodiment of the bicycle 100 shown in FIG. 1 having the handlebars shown in FIG. 2, the light sources 134 of the light assemblies 106a, 106b can be adjusted in an up and down direction, as indicated by the arrow 146 in FIG. 2, and also in a side-to-side direction as indicated by the arrow 150 in FIG. 2.

More particularly, the lighting assemblies 106a, 106b can be independently adjusted by the bicyclist so that the light sources 134 illuminate different areas in front of the bicycle 100 along the direction of travel of the bicycle. It will be appreciated that since the light assemblies 106 are adjustable in an up and down direction, as indicated by arrow 146, the bicyclist can adjust the light source 134 to illuminate the ground over a range of distances in front of the bicycle 100. Further, since the light assemblies 106 are adjustable from side-to-side, the bicyclist can also independently adjust the light sources 134 so as to illuminate objects either directly in front of the bicycle 100 or to the side of the intended path of travel of the bicycle 100.

Figure 4:
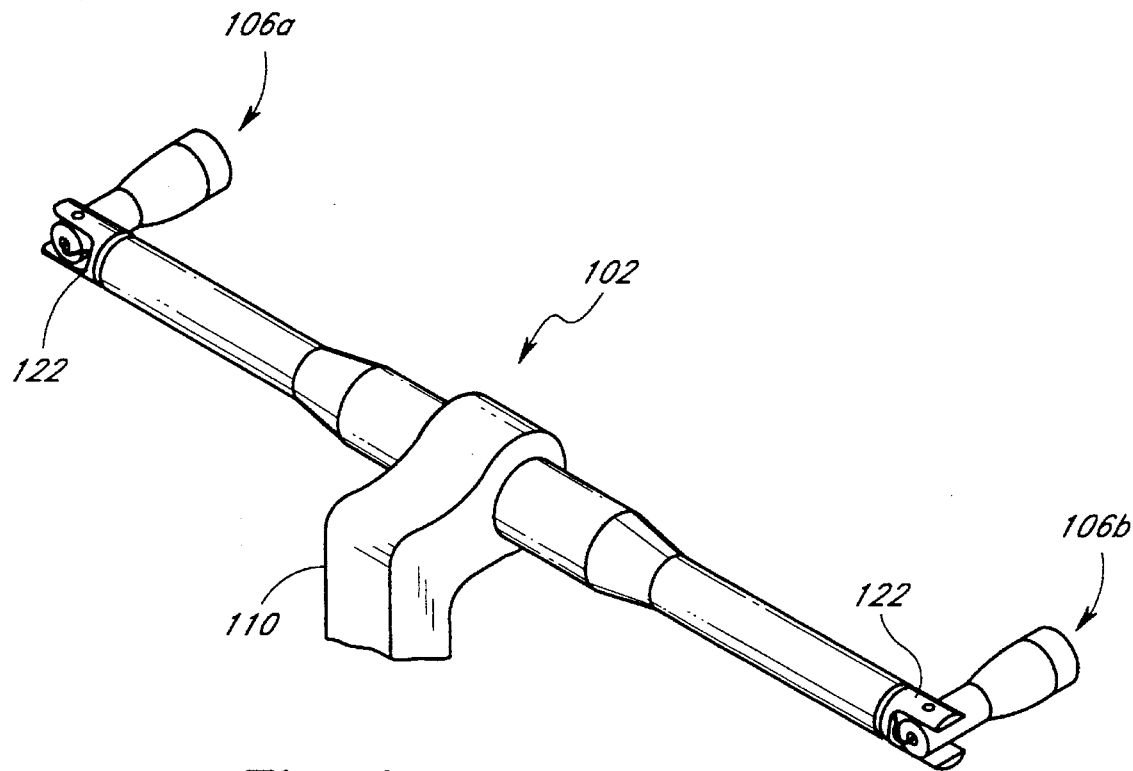
FIG. 4 is another embodiment of a handlebar and light assembly wherein the light assemblies are mounted at the end of the handlebars of a bicycle.

FIG. 4 illustrates an alternative embodiment of the present invention wherein the light assemblies 106a, 106b are positioned in the openings in the end of the handlebars 102 of the bicycle 100. It will be understood, of course, that bar end members are not preferred by every bicyclist and the light assemblies 106a, 106b can be readily installed in the end openings of the handlebars 102 in the same manner as described above. Specifically, the handlebars 102 are generally hollow so that the power source 120 can be positioned therein and the circular plug portion 124 of the bracket plug 122 can be configured to flushly fit within the opening of the handlebars 102. It can be appreciated that the light sources 134 of the light assemblies 106 shown in FIG. 4 are also adjustable both up and down and also from side-to-side in the same manner as described above. Hence, it will be appreciated that the light assemblies 106 of the preferred embodiments can be positioned either at the end of bar end members or at the end of handlebars so as to be generally pointed in the direction of travel of the bicycle 100. The bicyclist can independently adjust the light assemblies 106a, 106b so as to illuminate different regions in the path of travel of the bicycle.

Figure 5:
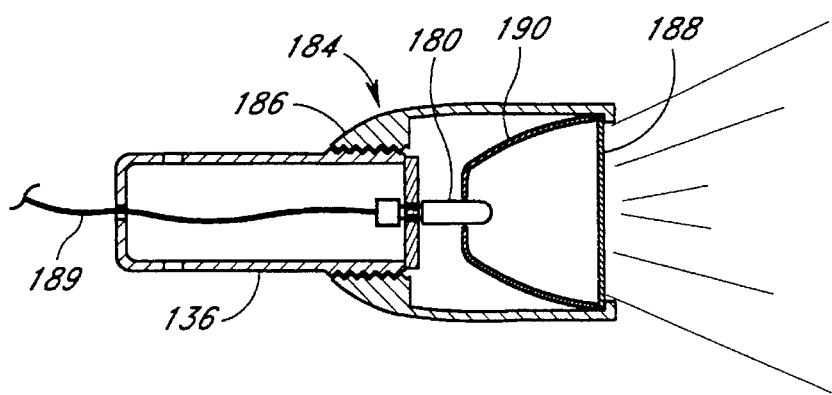
FIG. 5 is a sectional view of a light source of the light assembly, taken along the lines 5—5 in FIG. 3 illustrating the construction of the light source.

FIG. 5 is a cross-sectional view of the light source 134 used in either of the embodiments described hereinabove. A light bulb 180 is mounted within a retaining plate 182 that is positioned in an opening at a first end 184 of the mounting housing 136. The light bulb 180 is electrically connected to the power source 120 (FIG. 3) via an electrical wire 189 that extends out of the mounting housing 136, through an opening in the bracket plug 122, and to the power source 120 positioned within the handlebars 102 or the bar end members 104.

The casing of the light bulb 180 is grounded to the retaining plate 182 in a well-known manner. The first end 184 of the mounting housing 136 is threaded and a lens cover 186 is threadably mounted on the first end 184 of the mounting housing 136. The lens cover 186 includes a focusing lens 188 and a curved reflector plate 190. The light bulb 180 is preferably positioned through an opening in the center of the reflector plate 190 and the reflector plate 190 is preferably configured so that the light produced by the light bulb 180 is directed through the focusing lens 188. The focusing lens 188 focuses the light into a beam which is projected in the direction that the light source 134 is facing.

Since the lens cover 186 is threadably engaged with the mounting housing 136, the lens cover 186 can be adjusted with respect to the light bulb 180. This allows the bicyclist to adjust the focal length of the beam produced by the light source 134. Hence, the bicyclist can adjust one of the light assemblies 106a, 106b to illuminate a smaller area more intensely and then adjust the other light source to illuminate a larger area with less intensity. It will be appreciated that the light source 134 used in the light assemblies 106a, 106b should provide light of sufficient intensity to adequately illuminate the area in the path of travel of the bicycle.

In the preferred embodiment, flashlights using double AA batteries, such as those manufactured by Mag Lite Corporation, have been adapted to be used in the abovedescribed configuration. It will be appreciated, however, that any other light source having a light bulb with an appropriate intensity, can also be used without departing from the scope of the present invention.

Hence, since the power source 120 of the preferred embodiments of the light assembly 106 described above is positioned within the handlebars 102 or the bar end members 104, the profile of the light assembly 106 is substantially reduced when compared to the profile of prior art bicycle lamps. This results in a more streamlined appearance of the light assemblies which is generally more aesthetically pleasing than the large, bulky bicycle lamps of the prior art. In the preferred embodiment, the mounting housing and the lens housing have a diameter substantially the same as the diameter of the handlebars to accentuate this streamlined appearance.

Further, the light assemblies can be positioned at either end of the handlebars or at the ends of two separate bar end members and are independently adjustable about two axes. This provides greater light for the bicyclist and it also allows the bicyclist to selectively illuminate two separate areas along the path of travel of the bicycle as opposed to just one area along the path of travel of the bicycle.

Although the foregoing description of the preferred embodiment of the present invention has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit of the present invention. Consequently, the scope of the invention should not be limited to the foregoing discussion, but should be defined by the appended claims.

What is claimed is:

1. A method of positioning a light assembly on a bicycle comprising the steps of:

positioning a first power source within a handlebar assembly of said bicycle;

positioning a first light source on said handlebar assembly;

electrically connecting said first light source to said first power source;

adjusting said first light source in a transverse direction relative said bicycle; and adjusting said first light source in a vertical direction so that said light source illuminates a first region along the forward path of said bicycle after said adjusting steps.

2. The method of claim 1, wherein said step of positioning a first power source within a handlebar assembly comprises positioning a battery within a bar end member attached to a bicycle handlebar.

3. The method of claim 1, wherein said step of positioning said first light source on said handlebar assembly comprises positioning said first light source on a first end of said handlebar assembly.

4. The method of claim 3, further comprising the steps of:

positioning a second power source within said handle bar assembly;

positioning a second light source on a second end of said handlebar assembly;

electrically connecting said second light source to said second power source;

adjusting said second light source in a transverse direction relative said bicycle; and adjusting said second light source in a vertical direction so that said light source illuminates a second region along the forward path of said bicycle after said adjusting steps.

5. An assembly for a bicycle comprising: a bicycle handlebar assembly having a first and a second end;

a power source being sized to fit within said handlebar assembly; and a light source, electrically connected to said power source, wherein said light source is mounted at said first end of said handlebar assembly so that said light source produces a beam of light that shines in a path of forward travel of said bicycle and wherein said light source is adjustable with respect to said handlebar assembly to permit selective illumination of said path of forward travel of said bicycle.

6. The assembly of claim 5, wherein said power source is comprised of a battery and said battery is positioned within said handlebar assembly.

7. The assembly of claim 5, wherein said light source is comprised of:

a housing;

a light bulb positioned within said housing; and a lens cover having a focusing lens, wherein said lens cover is positioned on said housing so that light produced by said light bulb is directed through said focusing lens.

8. The assembly of claim 5, wherein said handlebar assembly includes a pair of handlebars and said light assembly is configured to be positioned at an end of one of said handlebars with said power source positioned in an opening in said handlebar.

9. The assembly of claim 8, wherein said light source is configured to be mounted to said handlebar so as to be rotatably adjustable about a first axis defined by said handlebar and so as to be rotatably adjustable about a second axis substantially orthogonal to said first axis.

10. The assembly of claim 9, further comprising a bracket plug member, which includes a plug portion and a yoke portion connected thereto, wherein said plug portion is configured to flushly fit within said opening in said handlebar so as to be rotatable with respect to said handlebar and wherein said yoke portion includes two arms that extend substantially in the direction of said first axis when said plug portion is positioned within said opening in said handlebars, and said two arms are separated so as to define an opening that receives said light source and wherein said light source is securely mounted within said opening so that said light source is rotatable about an axis extending between said two arms.

11. The assembly of claim 5, wherein said handlebar assembly includes a pair of handlebars and a pair of bar end members positioned on said pair of handlebars and said light assembly is positioned at an end of one of said bar end members with said power source positioned in an opening in said bar end member.

12. The assembly of claim 11, wherein said light source is mounted to said bar end member so as to be rotatably adjustable about a first axis defined by said bar end member and so as to be rotatably adjustable about a second axis substantially orthogonal to said first axis.

13. A handlebar assembly for a bicycle comprising:

a pair of handlebars extending outward from a central column and terminating in an outer end;

a first light assembly mounted adjacent said outer end of a first handlebar of said pair of handlebars, wherein said first light assembly includes a first power source that is positioned inside of said handlebar and wherein said first light assembly also includes a first light source that is adjustable by a bicyclist both transversely and vertically so as to project a first beam of light that can be directed to illuminate a first region along the path of travel of said bicycle.

14. The handlebar assembly of claim 13, further comprising a second light assembly mounted on said outer end of a second handlebar of said pair of handlebars, wherein said second light assembly includes a second power source that is positioned inside of said handlebar and wherein said second light assembly also includes a second light source that projects a second beam of light and wherein said second light assembly is adjustable independently of said first light assembly so that said second beam of light can be directed to illuminate a second region along the path of travel of said bicycle.

15. The handlebar assembly of claim 13, wherein said handlebars include an opening at said outer ends and said first light assembly further comprises a first bracket plug member having a plug portion, that is configured to be positioned in said opening in said handlebar, and a yoke portion that is configured to receive said first light source.

16. The handlebar assembly of claim 15, wherein said plug portion of said first bracket plug member is rotatable within said opening in said first handlebar to allow said bicyclist to position said first light source to illuminate said first region along the path of travel of said bicycle.

17. The handlebar assembly of claim 16, wherein said yoke portion of said first bracket plug member includes two arms that define an opening therebetween and said light source is retained in said opening by a retaining pin extending between said arms and through a said light source so that said light source is rotatable between said arms of said yoke portion of said first bracket plug.

18. The handlebar assembly of claim 17, wherein said bicyclist can position said first light source so as to move said beam in a generally vertical direction with respect to said bicycle by rotating said first bracket plug member with respect to said handlebars and wherein said bicyclist can position said light source so as to move said beam in a generally lateral direction with respect to said bicycle by rotating said first light source about said retaining pin.

19. A handlebar assembly for a bicycle comprising:

a pair of handlebars extending outward from a central column and terminating in an outer end;

a pair of bar end members positioned on said pair of handlebars and extending generally upward therefrom and terminating in an outer end;

a first light assembly mounted on said outer end of a first bar end member of said pair of bar end members, wherein said first light assembly includes a first power source that is positioned inside of said first bar end member and wherein said first light assembly also includes a first light source that projects a first beam of light and wherein said first light assembly is adjustable by a bicyclist so that said beam of light can be directed to illuminate a first region along the path of travel of said bicycle.

20. The handlebar assembly of claim 19, further comprising a second light assembly mounted on said outer end of a second bar end member of said pair of bar end members, wherein said second light assembly includes a second power source that is positioned inside of said second bar end member and wherein said second light assembly also includes a second light source that projects a second beam of light and wherein said second light assembly is adjustable independently of said first light assembly so that said second beam of light can be directed to illuminate a second region along the path of travel of said bicycle.

21. The handlebar assembly of claim 19, wherein said bar end members include an opening at said outer ends and said first light assembly further comprises a first bracket plug member having a plug portion, that is configured to be positioned in said opening in said bar end member, and a yoke portion that is configured to receive said first light source.

22. The handlebar assembly of claim 21, wherein said plug portion of said first bracket plug member is rotatable within said opening in said first bar end member to allow said bicyclist to position said first light source to illuminate said first region along the path of travel of said bicycle.

23. The handlebar assembly of claim 22, wherein said yoke portion of said first bracket plug member includes two arms that define an opening therebetween and said light source is retained in said opening by a retaining pin extending between said arms and through a said light source so that said light source is rotatable between said arms of said yoke portion of said bracket plug.

24. The handlebar assembly of claim 23, wherein said bicyclist can position said first light source so as to move said beam in a generally lateral direction with respect to said bicycle by rotating said first bracket plug member with respect to said handlebars and wherein said bicyclist can position said light source so as to move said beam in a generally vertical direction with respect to said bicycle by rotating said first light source about said retaining pin.

* * * * *